UNITED STATES PATENT OFFICE.

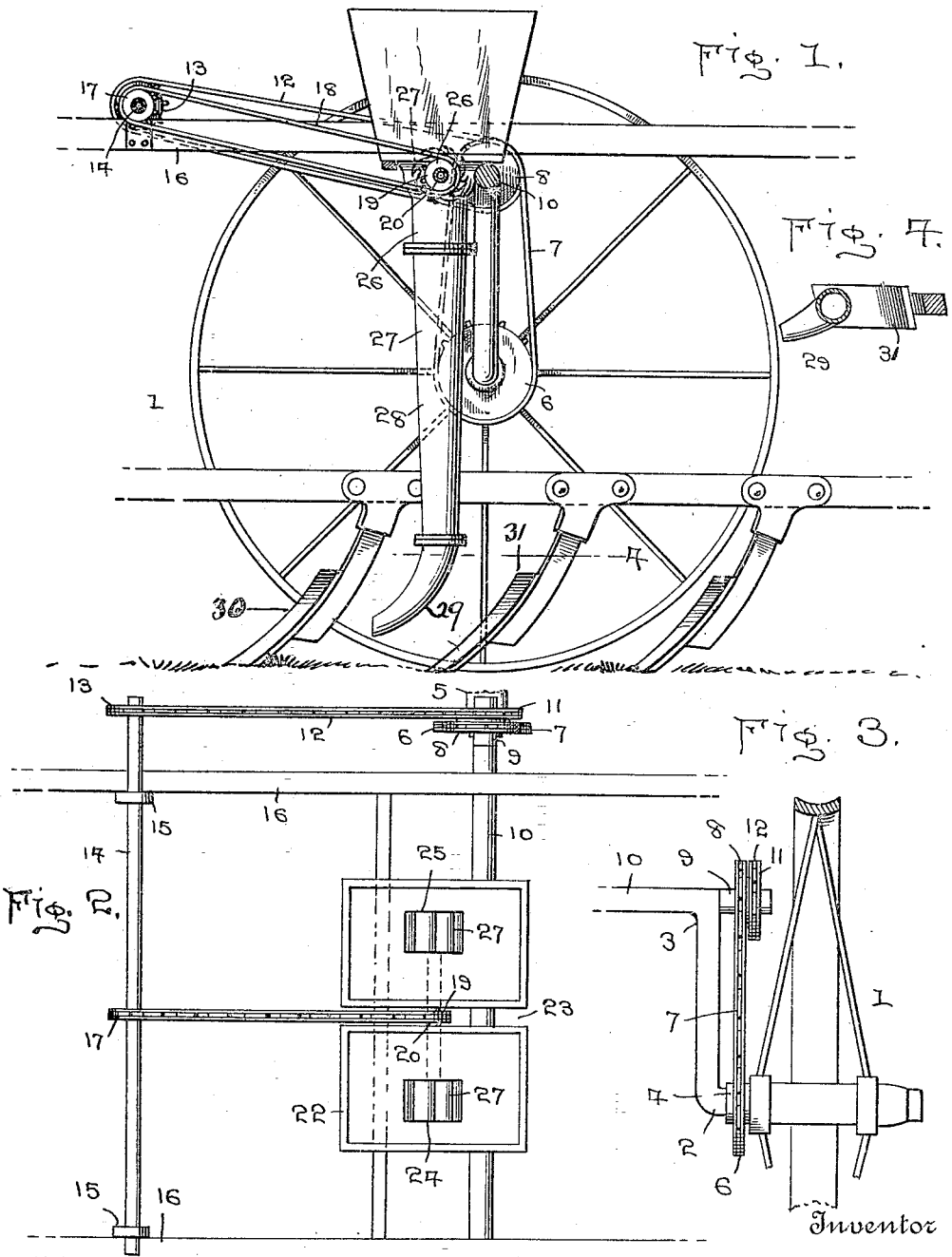

VIRGIL TERRY, OF NEAR ROACHDALE, INDIANA.

FERTILIZING ATTACHMENT FOR CULTIVATORS.

1,127,317. Specification of Letters Patent. Patented Feb. 2, 1915.

Application filed October 29, 1913. Serial No. 798,086.

*To all whom it may concern:*

Be it known that I, VIRGIL TERRY, citizen of the United States, residing one and one-half miles west of Roachdale, in the county of Putnam and State of Indiana, have invented certain new and useful Improvements in Fertilizing Attachments for Cultivators, of which the following is a specification.

This invention relates to an improvement in devices for fertilizing corn with a cultivator while the corn is being plowed.

The invention consists in the construction hereinafter pointed out.

In the annexed drawings: Figure 1 is a side view of the device, one wheel of the cultivator being removed. Fig. 2 is a plan view. Fig. 3 is an end view of part of the operative gear. Fig. 4, a detail.

In these drawings, the figure 1 designates one of a pair of traction wheels of a cultivator which is journaled upon the journal, 2, of an arched axle, 3. To the inner end, 4, of the hub, 5, of the wheel, 1, is fastened a sprocket wheel, 6. From this sprocket wheel, 6, there extends upwardly a sprocket chain, 7, which engages another sprocket wheel, 8, loose upon an arbor, 9, extending out from the arch, 10, of the arched axle and in line with the journal end, 2. Secured to, or made with, this sprocket wheel, 8, is another sprocket wheel, 11, also loose upon the arbor, 9. Extending forwardly from this sprocket wheel, 11, is a sprocket chain, 12, which engages a sprocket wheel, 13, fastened to a counter shaft, 14, passing across the cultivator in front of the axle, slightly above the plane of the arch, 10, of the axle, 3, and mounted in bearings, 15, of the frame side, 16. About midway, the shaft, 14, has secured thereto a sprocket wheel, 17, from which there extends rearwardly a sprocket chain, 18, which engages a sprocket wheel, 19, on a countershaft 20, which is journaled in front of and in substantially the same horizontal plane with the arch, 10, of the axle, 2, and in the bottom of two fertilizer boxes, 21 and 22, secured to the cultivator in any convenient way, as to the axle and side frames, as shown. These fertilizer boxes, 21 and 22, are spaced apart, and in the space, 23, between them, the sprocket wheel, 19, on feed shaft, 20, is located. In the bottom of these boxes, 21 and 22, are openings, 24 and 25, and the feed shaft, 20, passes below these openings, 24 and 25. Secured on the feed shaft, 20, at each opening, is a wheel, 26, having teeth, 27, which project upwardly through the opening into the boxes. Secured to the bottom of these boxes, 21 and 22, at the openings, 24 and 25, are the tops, 26, of ordinary feed chutes, 27, having flexible bodies, 28, and the metallic pieces, 29. These chutes, 27, are arranged so that the mouthpieces, 29, will come just in front of the cultivator shovel, 30.

In use, the fertilizer is placed in the boxes, 21 and 22. As the cultivator is driven, to cultivate corn, motion from the wheel, 1, is transmitted through the several sprocket wheels and chains to the feed shaft, 20. As this shaft turns, it causes the teeth, 27, of the wheel, 26, to force the fertilizer down from the boxes, and as it passes down the chutes it falls in front of the shovel, and with the earth is turned over toward the growing corn.

Having described my invention, what I claim is:—

A cultivator provided with a vertical arch, a countershaft and a feed shaft in advance of the arch, the arch carrying a sprocket wheel, the countershaft carrying two sprocket wheels, and the feed shaft carrying one sprocket wheel, a sprocket chain connecting the sprocket wheel on the arch with one sprocket wheel on the countershaft, and another sprocket chain connecting the other sprocket wheel of the countershaft with the sprocket wheel of the feed shaft, and drive means connecting one of the wheels with the sprocket wheel on the arch.

In testimony whereof I affix my signature in presence of two witnesses.

VIRGIL TERRY.

Witnesses:
 JOHN B. MURPHY,
 BESSIE WHITTINGTON.

Copies of this patent may be obtained for five cents each, by addressing the "Commissioner of Patents, Washington, D. C."